UNITED STATES PATENT OFFICE.

JOHN C. FR. SALOMON, OF BALTIMORE, MARYLAND.

IMPROVEMENT IN LIQUIDS USED AS A MOTIVE POWER.

Specification forming part of Letters Patent No. 15,391, dated July 22, 1856.

*To all whom it may concern:*

Be it known that I, JOHN C. FR. SALOMON, of the city of Baltimore, in the State of Maryland, have invented a certain new and useful Gaseous Liquid, which is compounded according to the law and nature of isomeric and basic substances contained in organic and inorganic matter, which I denominate "sulphoil carbonic acid," and which is applicable as a propelling agent to the same purposes and in a similar manner to which steam is used; and I do hereby declare that the following is a full, clear, and exact description thereof.

Carbonic-acid gas has been experimented with as a motive power in every variety of form; but the great difficulty of condensing it and of producing vessels sufficiently close in their texture to contain it without waste, though possessing great motive power in itself, is nevertheless impracticable for the purpose if used alone. The bisulphuret of carbon has also been used for the like purpose, and is found to be a powerful agent; but after a short time it roughens the metal, so as to produce too much friction in the working parts.

The object of my invention is to produce a liquid compound that will facilitate the condensation of the carbonic-acid gas, render the vessels in which it is contained impervious to it, and at the same time act as a lubricator to all the parts it comes in contact with, and it consists in the chemical union of bisulphuret of carbon, oil, and coal-tar, (stearin and elain,) to be used in combination with carbonic-acid gas, liquefied by cold and compression, as a motive power.

To enable others to make and use my invention, I will proceed to describe the *modus operandi*.

The carbonic-acid gas is first generated in any well-known apparatus (in a manner so generally understood as not to require any particular explanation here) under a pressure of about thirty-six atmospheres, and in another vessel, which will bear the same amount of pressure, I deposit one part of coal-tar, three parts of oil, and eight parts of bisulphuret of carbon, or about in that or any other suitable proportions, and add sufficient cold oil of vitriol or hypochlorous acid to decompose the bisulphuret of carbon into liquid carbonic acid. The oil of vitriol or hypochlorous acid does not mix with the oil and coal-tar; but if this compound is surcharged with the decomposing agent the surplus lies at the bottom of the vessel, it being the heaviest of all the ingredients. It should therefore be used according to the judgment of the manufacturer and the strength of the acid. I have found about one part of the acid to sixteen parts of the bisulphuret of carbon to be the required proportions. In the decomposing process a great amount of pressure is generated, which causes a perfect mixture and chemical union of the several ingredients, forming a liquid of an oily nature, and when this is accomplished no more of the decomposing agent (oil of vitriol or hypocholoric acid) is required. This compound (being kept in a tight vessel) is what I denominate "sulphoil carbonic acid;" but if opened and exposed to the atmosphere the carbonic acid vaporizes and escapes, leaving the undecomposed bisulphuret of carbon, in combination with the oil and coal-tar, behind. The two vessels— one containing carbonic-acid gas and the other the sulphoil carbonic acid—are then connected together, and the carbonic-acid gas thoroughly impregnates the sulphoil carbonic-acid liquid and forms a gaseous liquid, which represents the totality of my motive power, and is then ready for use, being about in the proportion of three of the liquid to one hundred of the carbonic-acid gas in combination.

In this compound three of the substances employed—viz., the bisulphuret of carbon, the carbonic acid, and the coal-tar—in part act as motive powers by virtue of their capability of expanding and condensing, while the other substance, (oil,) besides mediating a uniform admixture of the former, acts principally as a lubricating substance by greasing the machinery, into which it is mechanically driven by the gases. The carbonic-acid gas is more easily controlled and condensed than when used alone, and the coal-tar effectually stops all the pores of the metal.

In connection with this sulphoil carbonic acid as a medium may be employed all those isomeric and basacigen substances which will produce or give forth a gaseous power, and must be used according to the laws of substitution, affinity, combination, and chemical union, and can thus be made serviceable as motive agents. To apply this medium or agent to propel machinery a copper worm should be used, one end of which is connected with the vessel in which the sulphoil carbonic acid is contained, and the other with the cylinder of the engine, serving as a supply-pipe, which, together with the cylinder, is submerged in an oil-bath, which is heated in order to expand the gaseous liquid on its passage from the reservoir to and in the cylinder to work the engine, and is thence exhausted into any suitable condensing apparatus, where it is immediately condensed by injecting it into the reservoir containing the same liquid for reuse.

Before the liquid is heated by fuel the atmospheric temperature will ordinarily cause it to indicate on the pressure-gage about forty-five pounds to the square inch, and on the application of heat the pressure will increase in the ratio of one pound per square inch to every degree increased heat, (Fahrenheit,) and, being condensed in its parent liquid, may be used over and over again at a small cost of fuel, as 150° of heat absorbed in the oil bath will produce as many pounds of available pressure.

Having thus described my invention, what I claim as new, and desire to secure by Letters Patent, is—

The sulphoil carbonic-acid liquid, prepared in the manner substantially as described, and used in combination with carbonic acid generated in any known way, or other equivalent liquefiable gas, as a motive power.

In testimony whereof I hereunto affix my name this 7th day of July, 1856.

JOHN C. FR. SALOMON.

Witnesses:
A. H. PENINGTON,
GEORGE C. T. SALOMON.